United States Patent
Rangarajan et al.

(10) Patent No.: US 10,664,006 B2
(45) Date of Patent: May 26, 2020

(54) METHOD AND APPARATUS FOR AUTOMATIC SWITCH TO RETENTION MODE BASED ON ARCHITECTURAL CLOCK GATING

(71) Applicant: QUALCOMM Incorporated, San Diego, CA (US)

(72) Inventors: Bharat Kumar Rangarajan, Bangalore (IN); Rakesh Misra, Bangalore (IN); Rajesh Arimilli, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 15/868,211

(22) Filed: Jan. 11, 2018

(65) Prior Publication Data

US 2019/0212768 A1 Jul. 11, 2019

(51) Int. Cl.
*G06F 1/26* (2006.01)
*G06F 1/10* (2006.01)
*G06F 1/3234* (2019.01)
*G06F 1/3237* (2019.01)

(52) U.S. Cl.
CPC ............... *G06F 1/10* (2013.01); *G06F 1/266* (2013.01); *G06F 1/3237* (2013.01); *G06F 1/3243* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 9,417,648 B1 * | 8/2016 | Venkatasubramanian ................... G05F 3/02 |
| 9,564,897 B1 | 2/2017 | Berzins et al. | |
| 9,618,956 B2 | 4/2017 | Gill et al. | |
| 2007/0057767 A1 * | 3/2007 | Sun ......................... G06F 1/3228 340/7.35 |
| 2007/0140396 A1 * | 6/2007 | Yang ......................... G06F 1/08 375/362 |
| 2016/0209907 A1 * | 7/2016 | Han ....................... G06F 1/3209 |
| 2016/0308372 A1 | 10/2016 | Kolla et al. | |
| 2017/0186576 A1 | 6/2017 | Cao et al. | |
| 2018/0338032 A1 * | 11/2018 | Baek ........................ H04L 67/22 |

* cited by examiner

*Primary Examiner* — Zahid Choudhury

(74) *Attorney, Agent, or Firm* — Qualcomm Incorporated

(57) ABSTRACT

Method and Apparatus for automatically switching to a low power retention mode based on architectural clock gating is disclosed. In some implementations, a system includes a central processing unit (CPU), comprising a clock gating cell configured to receive a clock enable signal. The system further includes a switching module configured to monitor the clock enable signal and to cause a power manager to switch the CPU from a first power supply output to a second power supply output in response to the clock enable signal changing from a first state to a second state.

17 Claims, 4 Drawing Sheets

METHOD AND APPARATUS FOR AUTOMATIC SWITCH TO RETENTION MODE BASED ON ARCHITECTURAL CLOCK GATING

FIELD OF DISCLOSURE

Aspects of the present disclosure relate generally to low power modes in computing systems, and more particularly to methods and apparatuses for automatic switch to retention mode based on architectural clock gating.

BACKGROUND

Reducing power consumption on a chip is desirable, especially when the chip is in a battery-powered mobile device. The chip typically has a system implemented thereon, and thus, is commonly referred to as a system on a chip ("SoC"). Contributors to power consumption in the SoC include dynamic power of various components within the SoC due to switching of transistors on the chip, and leakage power due to current leakage of transistors on the chip. Among the components in the SoC, central processing units (CPUs), which may be referred to as processing cores or processors, tend to consume a significant portion of the power.

To conserve power, a CPU that is not currently active may be placed in one of multiple low power modes. One conventional low power mode is implemented entirely within a CPU. In such a low power mode, the clock signal to the CPU is gated to reduce dynamic power of the CPU. This mode is useful when the CPU is not expected to perform operations. By gating the clock signal, transistors and various components within the CPU should not switch or change state unnecessarily. However, the CPU still exhibits significant power leakage because the CPU is still receiving power during such low power mode and current leaks through transistors within the CPU.

Additional power saving measures may be taken by resources outside of the CPU in some other the conventional low power modes. These additional power saving measures are typically implemented using software and/or firmware. One drawback of such measures is the latency at entry and/or exit of these low power modes. Thus, there is a need in the industry for low power modes that do not sacrifice latency for power saving.

SUMMARY OF THE DISCLOSURE

The following presents a simplified summary of one or more implementations to provide a basic understanding of such implementations. This summary is not an extensive overview of all contemplated implementations, and is intended to neither identify key or critical elements of all implementations nor delineate the scope of any or all implementations. The sole purpose of the summary of the disclosure is to present some concepts of one or more implementations in a simplified form as a prelude to the more detailed description that is presented later.

In some implementations, a system includes a central processing unit (CPU), comprising a clock gating cell configured to receive a clock enable signal. The system further includes a detection module configured to monitor the clock enable signal and to cause a power manager to switch the CPU from a first power supply output to a second power supply output in response to the clock enable signal changing from a first state to a second state. Further, the first power supply output is higher than the second power supply output. The detection module can be further configured to cause the power manager to switch the CPU from the second power supply output back to the first power supply output in response to the clock enable signal changing from the second state back to the first state.

In some implementations, the system further includes an analog power multiplexor (APM) controller coupled to the detection module and the CPU, wherein the CPU further comprises at least one cache memory and an APM configured to couple the at least one cache memory to a power supply rail in response to a signal from the APM controller. The APM may couple the at least one cache memory to a memory power domain supply rail (MX) or an application processor domain supply rail (APC) based on a leakage ratio of APC/MX.

In some implementations, the system further includes a block head switch (BHS), a low droop oscillator (LDO), wherein the APC is coupled to an input of the BHS and an input of the LDO. The first power supply output is an output of the BHS, whereas the second power supply output is an output of the LDO.

In some implementations, a method to automatically switch to a low power retention mode based on architectural clock gating is provided. The method includes tapping onto a clock enable signal at an input of a clock gating cell of a central processing unit (CPU), and switching a power supply of the CPU from a first power supply output to a second power supply output in response to the clock enable signal changing from a first state to a second state. The first power supply output is higher than the second power supply output. The method can further include switching the CPU from the second power supply output back to the first power supply output in response to the clock enable signal changing from the second state back to the first state.

In some implementations, the first power supply output is an output of a block head switch (BHS). The second power supply output is an output of a low droop oscillator (LDO).

In some implementations, the method further includes switching an analog power multiplexor (APM) to one of a memory power domain supply rail (MX) or an application processor domain supply rail (APC) upon de-assertion of the clock enable signal. Furthermore, the switching the APM can be based on a leakage ratio of APC to MX (APC/MX).

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

To conserve power and to increase the days of use of mobile electronic devices, a low power retention mode with low latency is disclosed herein. In contrast to conventional low power modes, the low power retention mode disclosed is implemented entirely using hardware to achieve low latency. In some implementations, a central processing unit (CPU) has a clock gating cell configured to gate or to pass an incoming clock signal. Transistors within the CPU operate in response to the clock signal. When the clock enable signal is asserted, the clock gating cell passes the clock signal so that the CPU can operate. When the clock enable signal is de-asserted, the clock gating cell gates the clock signal so that the CPU should not perform any operation, thus saving dynamic power. To further reduce power consumption, the CPU can be switched to a different power supply that provides a lower voltage, which suffices for the CPU to maintain data in cache memory within the CPU and in CPU logic (e.g., standard cells), but not high enough to guarantee proper operation of the CPU. In some implementations, a detection module monitors the clock enable signal of the clock gating cell. When the clock enable signal is de-asserted, the detection module triggers a CPU power manager to switch the CPU's power supply to a low power supply. With the CPU on a lower power supply, leakage power consumed by the CPU can be lowered. More details of the implementation of this low power retention mode are discussed below with reference to the figures.

Figure 1:
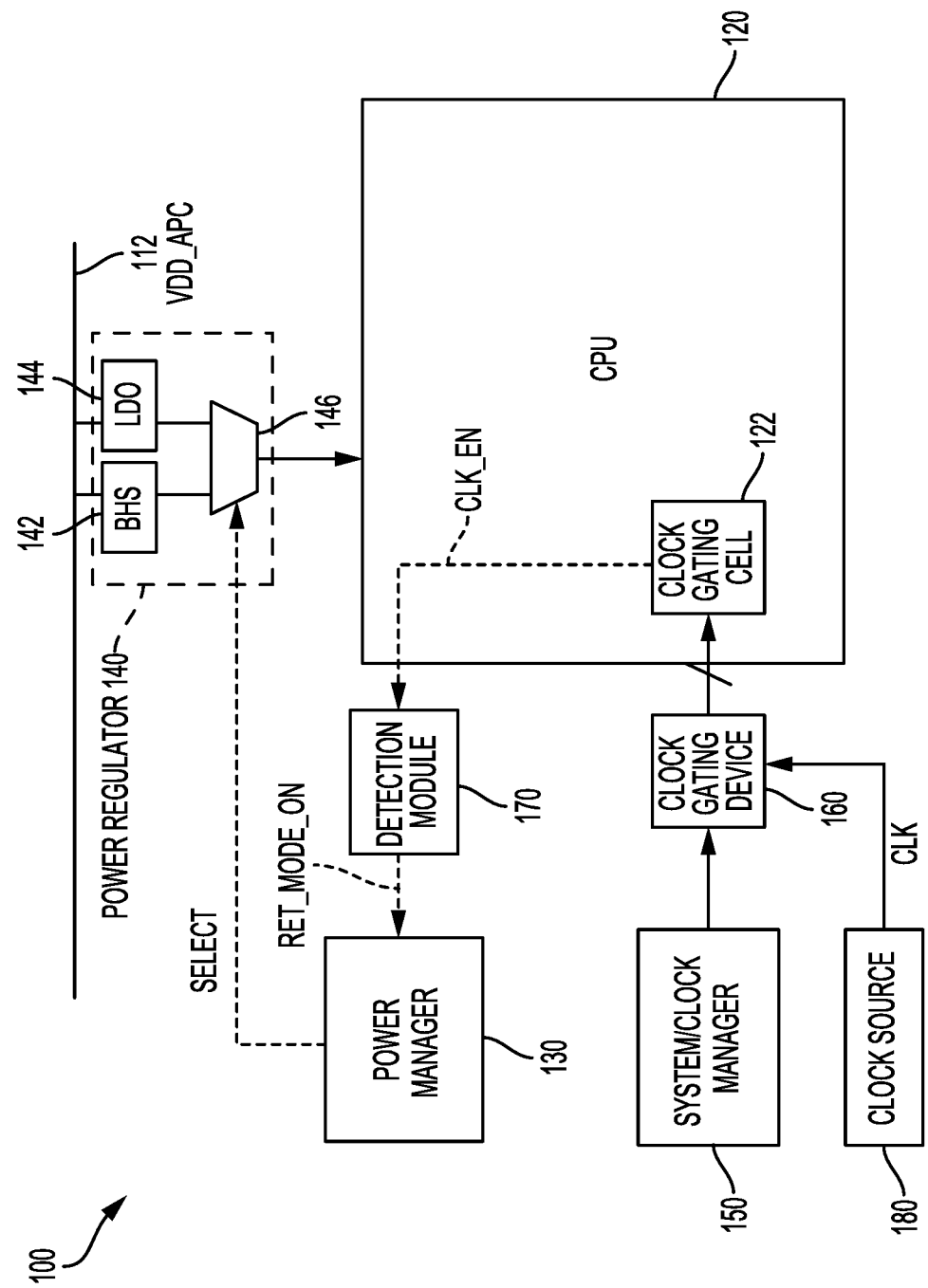
FIG. 1 is a block diagram of a system on a chip (SoC).

FIG. 1 illustrates one implementation of a system on a chip (SoC). SoC 100 can be used in a wide variety of applications, in particular, portable electronic devices, such as cellular telephones (e.g., smartphones), wearable electronic devices (e.g., smart watch), laptop computers, etc. As shown in FIG. 1, SoC 100 includes an application processor cluster (APC) power rail VDD_APC 112, a central processing unit (CPU) 120, a power manager 130, a power regulator 140, a clock manager 150, a clock gating device 160, a clock source 180, and a detection module 170. SoC 100 can include additional components (e.g., memories, radio frequency (RF) transceivers, etc.) not shown in FIG. 1. CPU 120 can be one of multiple CPUs (e.g., 4, 8, etc.) within a multi-core application processor. However, to avoid obscuring the drawing, only one CPU (i.e., CPU 120) is shown in FIG. 1. Nonetheless, the technique disclosed herein is applicable to SoCs having multiple processing cores as well.

Referring to FIG. 1, power regulator 140 is coupled between VDD_APC 112 and CPU 120. In some implementations, power regulator 140 includes a block head switch (BHS) 142, a low dropout regulator (LDO) 144, and a multiplexor 146. Both BHS 142 and LDO 144 are coupled to, and powered by, VDD_APC 112. Both BHS 142 and LDO 144 are configured to generate power supply outputs. BHS 142 is configured to output higher power than LDO 144. In some implementations, LDO 144 is initialized upon boot up of CPU 120 (or any one of the other CPUs of SoC 100) at a predetermined retention voltage (e.g., 0.4V). Outputs of both BHS 142 and LDO 144 are coupled to inputs of multiplexor 146. Multiplexor 146 receives a SELECT signal from power manager 130. Based on SELECT signal, multiplexor 146 passes either the power output of BHS 142 or the power output of LDO 144 to CPU 120.

In some implementations, CPU 120 is further coupled to clock gating device 160. CPU 120 has a clock gating cell 122 within, which receives a clock signal and a clock enable signal from clock gating device 160. Clock gating device 160 is coupled to clock source 180, which provides the clock signal CLK to clock gating device 160. In addition, clock gating device 160 is coupled to clock manager 150, which provides a control signal to control clock gating device 160.

In general, CPU 120 is a processing unit built with multiple transistors on silicon. CPU 120 may also be referred to as an application processor, a processing core, a processor, or the like. CPU 120 is powered by the power supply from power regulator 140 and runs on the clock signal CLK from clock source 180. Transistors and other electronic components within CPU 120 may change state, be charged or discharged, be turned on or off in response to CLK from clock source 180, and power is consumed during the course of such activities. Such power consumption is generally referred to as dynamic power consumption. Besides dynamic power consumption, transistors and electronic components within CPU 120 may consume power due to current leakage through at least some of the transistors and electronic components within CPU 120 when power is supplied to CPU 120. Such power consumption is referred to as leakage power consumption.

In some implementations, CPU 120 supports a retention mode. During the retention mode, CPU 120 is not expected to perform any operation, but data is still maintained in cache memory and CPU logic (e.g., standard cells) within CPU 120. To save power, clock gating cell 122 gates the clock signal during retention mode so that transistors and other electronic components within CPU 120 will not change state unnecessarily. However, CPU 120 still receives power from power regulator 140 while the clock signal is being gated. Thus, CPU 120 still consumes leakage power even though CPU 120 does not consume dynamic power during retention mode. Moreover, the higher the power supply, the more leakage power is consumed. As discussed above, some conventional systems may implement software to control power regulator 140 such that the power supplied to CPU 120 can be lowered to reduce leakage power consumption. However, the additional power saving comes at the expense of increased latency because the software generally takes longer to effect the change of power supply to CPU 120.

To avoid increased latency, SoC 100 implements a low power retention mode using hardware. In some implementations, SoC 100 includes modules to switch the power supply to CPU 120 automatically when CPU 120 goes into the low power retention mode. Like the retention mode discussed above, even though CPU 120 does not perform operations, data is still retained or maintained in the cache memory and in CPU logic (e.g., standard cells) within CPU 120 during the low power retention mode. Typically, a lower level of power suffices to retain data in the memory or cache within CPU 120. Thus, a different power supply (such as the power supply output from LDO 144) can be provided to CPU 120 during the low power retention mode. In some implementations, the power supply output of LDO 144 is set to be about 0.4V upon cold boot of CPU 120. One hardware-based implementation of the low power retention mode is described below with reference to FIG. 1.

As shown in FIG. 1, detection module 170 in SoC 100 is coupled to clock gating cell 122 within CPU 120 to monitor, or detect, a clock enable signal CLK_EN. When CLK_EN is gated, CPU 120 will cease performing normal or regular operations. When detection module 170 detects a CLK_EN, detection module 170 sends a control signal RET_MODE_ON to power manager 130 causing power manager 130 to send a signal SELECT to multiplexor 146 to select the output from LDO 144 instead of BHS 142. As a result, CPU 120 receives the lower power supply output from LDO 144 (instead of the higher power supply from BHS 142). Thus, the leakage power consumption within CPU 120 is reduced during low power retention mode. In some implementations, detection module 170 can be implemented with a finite state machine (FSM). Because the detection and switching between power supplies is performed in hardware, the switching takes less time compared to conventional software-based implementation. Such lower power consumption is particularly desirable in applications such as battery powered portable electronic devices, which generally have limited power supply. For instance, the low power retention mode can advantageously increase the days of use (DOU) of many smartphones.

In some implementations, detection module 170 continues monitoring CLK_EN at clock gating cell 122. When CLK_EN is ungated, the clock signal CLK is once again passed to various components within CPU 120. In response, CPU 120 exits the low power retention mode and starts performing operations again. At this point, the power supply to CPU 120 has to be increased. Therefore, detection module 170 de-asserts RET_MODE_ON to cause power manager 130 to switch back to the higher power supply (e.g., BHS 142).

Figure 2:
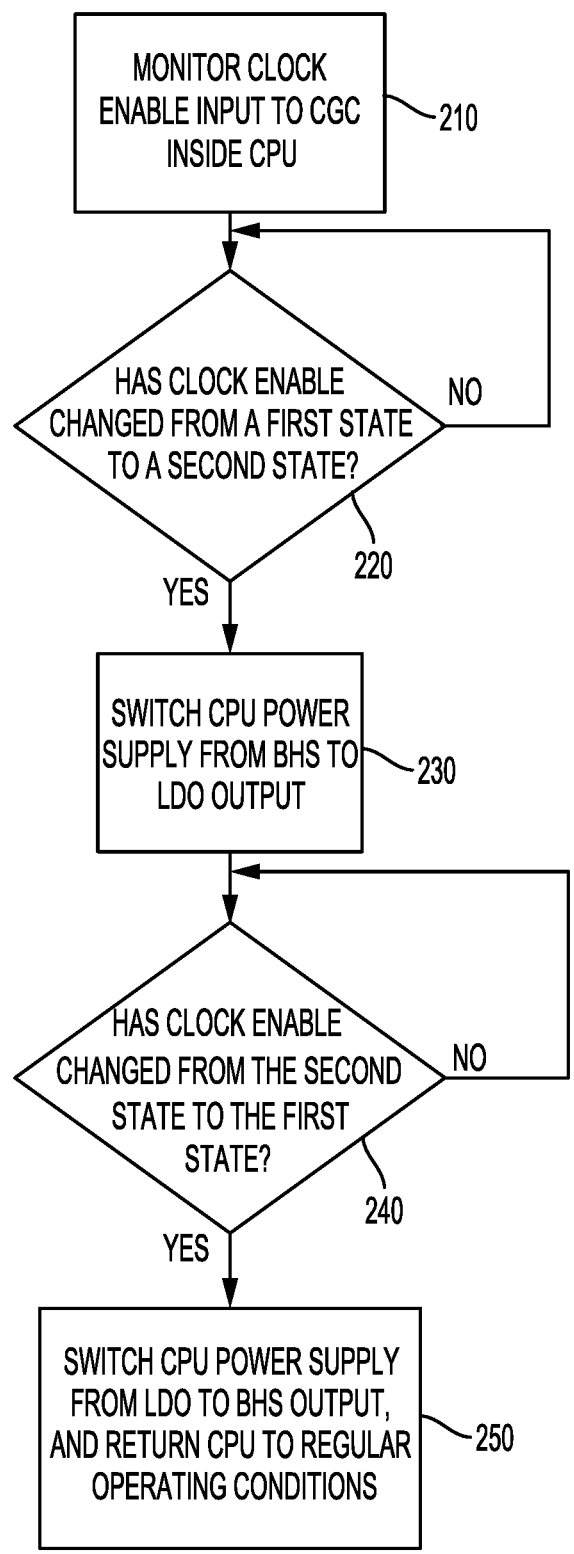
FIG. 2 is a flow diagram of one implementation of a process to automatically switch to low power retention mode based on architectural clock gating.

FIG. 2 illustrates a flow diagram of one implementation of a process to automatically switch to low power retention mode based on architectural clock gating. The operations shown in FIG. 2 can be performed by various hardware modules shown in FIG. 1. The process starts at block 210, where a clock enable signal input to a clock gating cell (CGC), such as clock gating cell 122 in FIG. 1, inside a CPU is monitored. In block 220, it is determined if the clock enable signal changes from a first state to a second state (e.g., the clock enable signal being de-asserted). When the clock enable signal remains in the first state (e.g., being asserted), the clock signal input to the CPU is not gated such that various components (e.g., gates, transistors, etc.) within the CPU can operate in response to the clock signal. While the clock enable signal is asserted, the process remains in block 220. When the clock enable signal changes from the first state to the second state (e.g., the clock enable signal is de-asserted), the CPU generally performs no operations, while retaining data stored in cache memory and in CPU logic (e.g., standard cells) within the CPU. Thus, the CPU is in an idle or standby mode. To save power, the process transitions to block 230, where the power supply to the CPU is switched from a higher power supply (e.g., output of BHS 142 in FIG. 1) to a lower power supply (e.g., output of LDO 144 in FIG. 1).

In some implementations, the process transitions from block 230 to block 240 to determine if the clock enable signal returns to the first state again. If the clock enable signal is not returned to the first state, then the process remains in block 240, where the power supply to the CPU remains low. Otherwise, the process transitions to block 250. At block 250, the CPU's power supply is switched from the lower power supply (e.g., output of LDO 144 in FIG. 1) back to the higher power supply (e.g., output of BHS 142 in FIG. 1) and the CPU returns to regular operating conditions.

Figure 3:
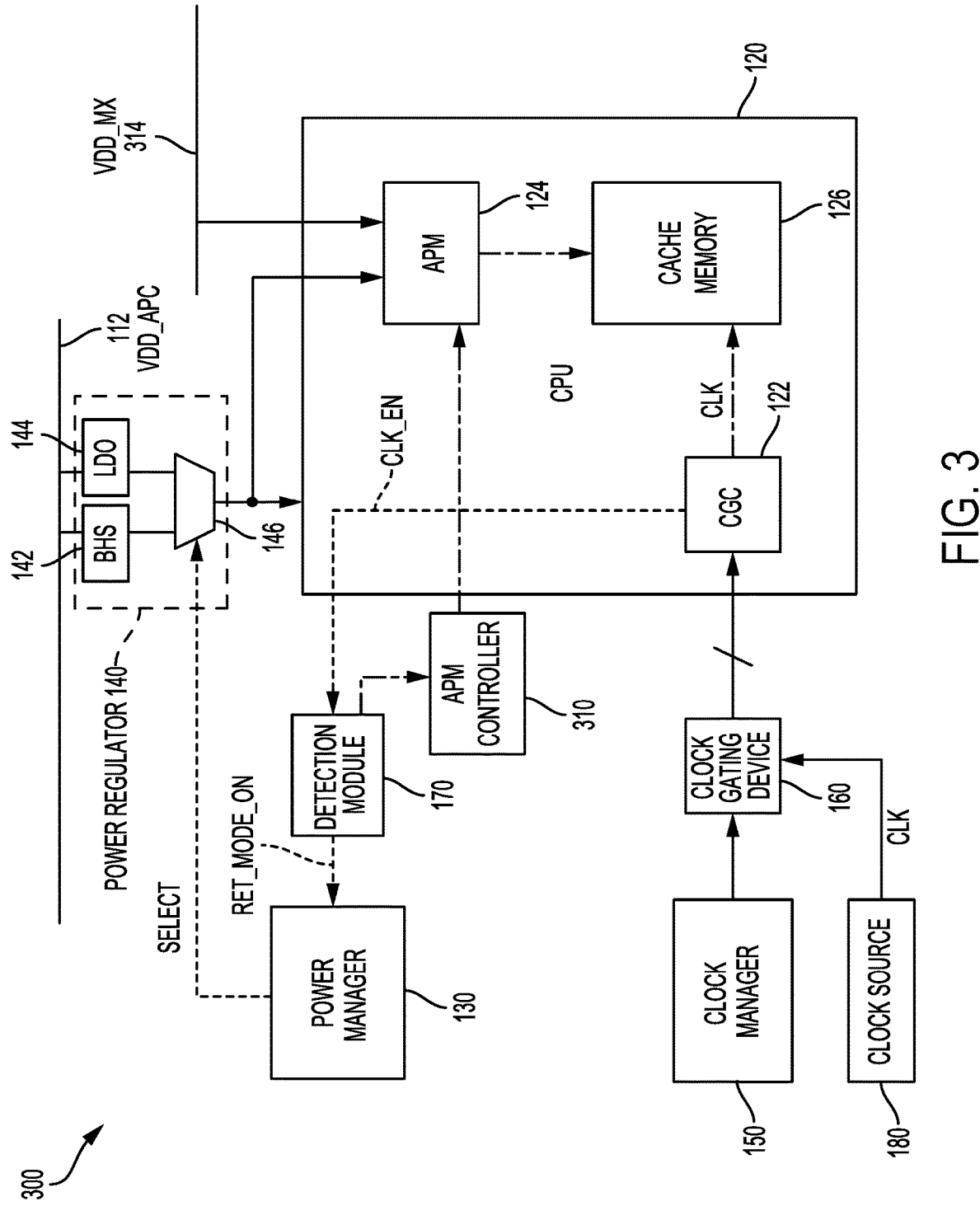
FIG. 3 is a block diagram of an alternate implementation of SoC that supports automatically switching to low power retention mode based on architectural clock gating.

FIG. 3 illustrates an alternate implementation of SoC that supports automatically switching to low power retention mode based on architectural clock gating. SoC 300 includes components shown in FIG. 1 (APC power rail VDD_APC 112, CPU 120, clock gating cell 122 within CPU 120, power manager 130, power regulator 140, clock manager 150, clock gating device 160, clock source 180, and detection module 170). In addition, SoC 300 includes a memory power rail VDD_MX 314 and an array power multiplexor (APM) controller 310. As illustrated in FIG. 3, CPU 120 further includes an APM 124 and a cache memory 126.

Cache memory 126 is a storage device within CPU 120 and may include level-1 (L1) cache memory, level-2 (L2) cache memory, or a combination of both. Cache memory 126 provides CPU 120 with faster memory access than main memory (e.g., dynamic random access memory (DRAM)), and may be used to store instructions that are to be executed by CPU 120 in the near future. Cache memory 126 is powered by either output of power regulator 140 or VDD_MX 314, known as a "memory power rail" via APM 124. More details of the operation of APM 124 are discussed below. Cache memory 120 may receive the clock signal CLK or another clock signal to time operations of cache memory 126. For example, cache memory 126 may receive the clock signal CLK via clock gating cell 122. In this example, gating of the clock signal CLK also indicates that the clock signal to cache memory 126 is gated, and therefore, cache memory 126 is idle.

In some implementations, cache memory 126 receives power from APM 124. APM 124 selects one of VDD_MX 314 or the power supply output of power regulator 140 and applies the selected power to cache memory 126. During normal operation, APM 124 selects VDD_MX 314 to power cache memory 126. The output of LDO 144 is VDD_APC 112 lowered by LDO 144. In some implementations, LDO 144 is initialized and programmed to set the output of LDO 144 at a retention voltage (e.g., 0.4V), which is a voltage sufficient to retain data in cache memory 126, but lower than required to guarantee proper read/write operation of cache memory 126. APM controller 310 can instruct APM 124 to select either VDD_MX 314 or the output of LDO 144 when CPU 120 enters retention mode, depending on which one dominates leakage power, or in other words, affects leakage power more. As discussed above, detection module 170 monitors clock enable signal at clock gating cell 122. When clock enable signal is de-asserted, CLK is gated in CPU 120, resulting in CPU 120 entering retention mode. Therefore, upon de-assertion of clock enable signal, detection module 170 sends a trigger signal to APM controller 310 to cause APM controller 310 to instruct APM 124 to select a power supply for cache memory 126 in the low power retention mode. In some implementations, a register in APM controller 310 is configured for the power rail selection for cache memory 126 in retention mode, which can be either VDD_MX 314 or the output of LDO 144 depending on the leakage ratio of VDD_APC to VDD_MX in CPU 120. In other words, the choice of power supply to cache memory 126 in the low power retention mode depends on which power supply dominates leakage in some implementations. For example, if the leakage ratio of VDD_APC 112 to VDD_MX 314 in CPU 120 is below 6, APM controller 310 can trigger APM 124 to select the output of LDO 144, that is VDD_APC 112 lowered by LDO 144. On the other hand, if the leakage ratio of VDD_APC 112 to VDD_MX 314 in CPU 120 is 6 or above, APM controller 310 can trigger APM 124 to select VDD_MX 314. The selection of power supply for cache memory 126 is further illustrated by the flow diagram in FIG. 4.

Figure 4:
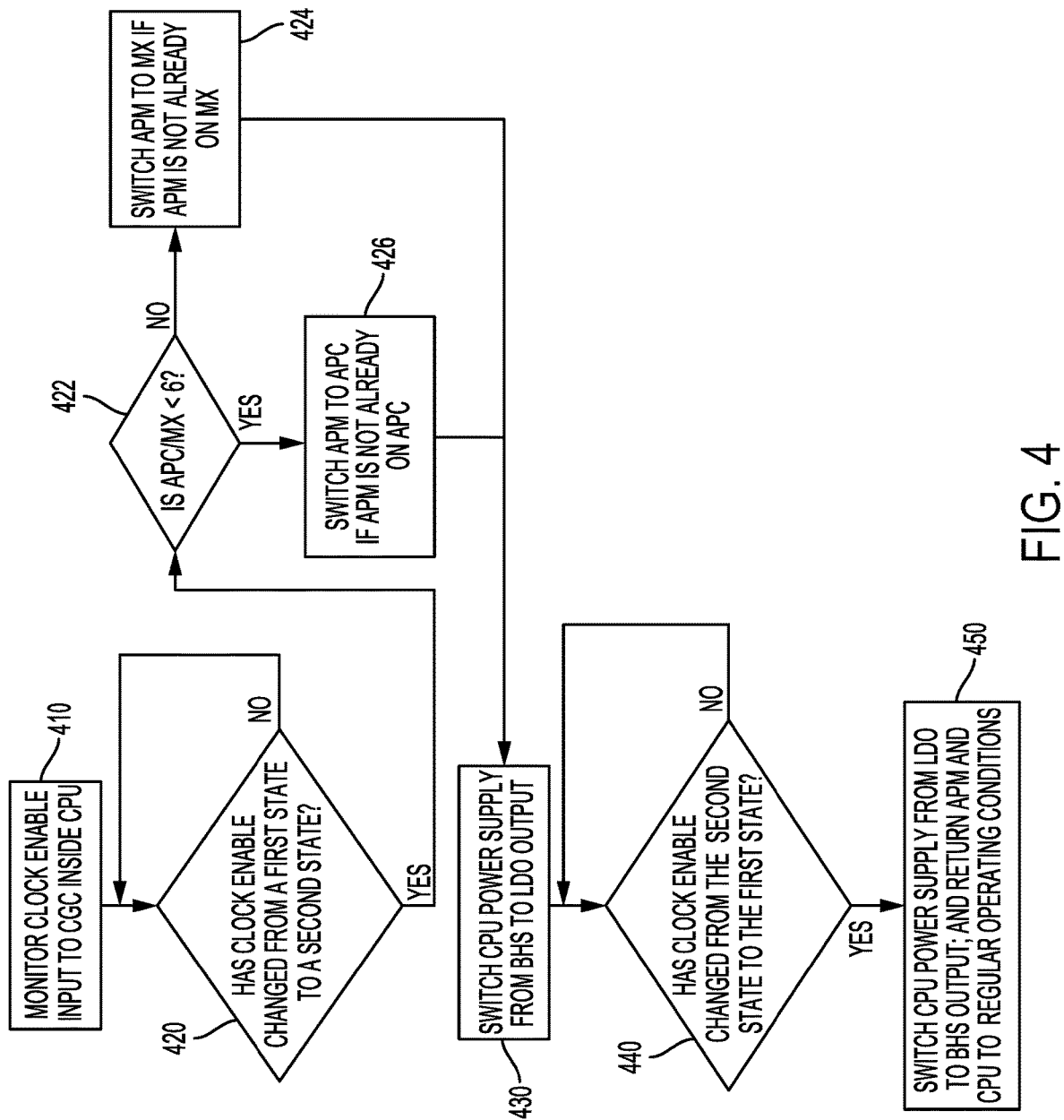
FIG. 4 is a flow diagram of one implementation of a process to automatically switch to low power retention mode based on architectural clock gating.

FIG. 4 illustrates a flow diagram of one implementation of a process to automatically switch to a low power retention mode based on architectural clock gating. The operations shown in FIG. 4 can be performed by various hardware modules shown in FIG. 3. The process starts at block 410, where a clock enable signal input to a clock gating cell (CGC), such as clock gating cell 122 in FIG. 3, is monitored. In block 420, it is determined whether the clock enable signal changes from a first state to a second state (e.g., the clock enable signal is de-asserted). When the clock enable signal is in the first state, the clock signal input to the CPU is not gated such that various components (e.g., gates, transistors, etc.) within the CPU can operate in response to the clock signal. In other words, the CPU is not in idle or standby mode. So the process remains in block 420 when the clock enable signal is in the first state. When the clock enable signal changes from the first state to the second state (e.g., the clock enable signal is de-asserted), the CPU generally performs no operation, but merely retains data stored in cache memory and in CPU logic (e.g., standard cells) within the CPU. Thus, the CPU is in a retention mode. The process transitions from block 420 to block 422 upon determination that the clock enable signal changes from the first state to the second state.

At block 422, it is determined whether the leakage ratio of an application CPU cluster power rail (APC) for memory to a memory power rail (MX) is less than a predetermined threshold (e.g., 6). If yes, the leakage power of a cache memory within the CPU is dominated by MX. Hence, an array power multiplexor (APM, such as APM 124 in FIG. 3) within the CPU is switched to select APC if APM is not already on APC in block 426. In contrast, if the leakage ratio of APC to MX is at or above the predetermined threshold, then the leakage power of the cache memory is dominated by APC. Therefore, the APM is switched to MX if the APM is not already on MX in block 424. From either block 424 or block 426, the process transitions to block 430.

In block 430, the power supply to the CPU is switched from a higher power supply (e.g., output of BHS 142 in FIG. 3) to a low power supply (e.g., output of LDO 144 in FIG. 3). Then the process transitions from block 430 to block 440 to determine if the clock enable signal returns to the first state again. If the clock enable signal is still in the second state, the CPU remains in the low power retention mode. So the process remains in block 440. Otherwise, the CPU has exited the low power retention mode. So the process transitions to block 450. At block 450, the CPU's power supply is switched from the lower power supply (e.g., output of LDO 144 in FIG. 3) back to the higher power supply (e.g., output of BHS 142 in FIG. 3) and both APM and CPU are returned to regular operating conditions.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system, comprising:
   a central processing unit (CPU), comprising a clock gating cell configured to receive a clock enable signal;
   a detection module configured to monitor the clock enable signal and to cause a power manager to switch the CPU from a first power supply output to a second power supply output, which is lower than the first power supply, in response to the clock enable signal being de-asserted; and
   an analog power multiplexor (APM) controller coupled to the detection module and the CPU, wherein the CPU further comprises at least one cache memory and an APM configured to couple the at least one cache memory to a power supply rail in response to a signal from the APM controller.

2. The system of claim 1, wherein the APM couples the at least one cache memory to a memory power domain supply rail (MX) or an application processor domain supply rail (APC) based on a leakage ratio of APC/MX.

3. The system of claim 2, further comprising a block head switch (BHS), and a low droop oscillator (LDO), wherein the APC is coupled to an input of the BHS and an input of the LDO.

4. The system of claim 3, wherein the first power supply output comprises an output of the BHS.

5. The system of claim 3, wherein the second power supply output comprises an output of the LDO.

6. The system of claim 1, wherein the detection module is further configured to cause the power manager to switch the CPU from the second power supply output back to the first power supply output in response to the clock enable signal being asserted.

7. A method, comprising:
   monitoring a clock enable signal at an input of a clock gating cell of a central processing unit (CPU);
   switching a power supply of the CPU from a first power supply output to a second power supply output, which is lower than the first power supply output, in response to the clock enable signal being de-asserted; and
   upon the clock enable signal being de-asserted, switching an analog power multiplexor (APM) to one of a memory power domain supply rail (MX) or an application processor domain supply rail (APC).

8. The method of claim 7, wherein the first power supply output comprises an output of a block head switch (BHS).

9. The method of claim 7, wherein the second power supply output comprises an output of a low droop oscillator (LDO).

10. The method of claim 7, wherein the switching the APM is based on a leakage ratio of APC to MX (APC/MX).

11. The method of claim 10, wherein switching the APM comprises:
    switching the APM to APC if the leakage ratio of APC/MX is less than 6.

12. The method of claim 10, wherein switching the APM comprises:
    switching the APM to MX if the leakage ratio of APC/MX is greater than or equal to 6.

13. The method of claim 7, further comprising switching the CPU from the second power supply output back to the first power supply output in response to the clock enable signal being asserted.

14. An apparatus, comprising:
- means for monitoring a clock enable signal at an input of a clock gating cell of a central processing unit (CPU);
- means for switching a power supply of the CPU from a first power supply output to a second power supply output, which is lower than the first power supply output, in response to the clock enable signal being de-asserted; and
- means for switching an analog power multiplexor (APM) within the CPU to one of a memory power domain supply rail (MX) or an application processor domain supply rail (APC) upon de-assertion of the clock enable signal based on a leakage ratio of APC/MX.

15. The apparatus of claim 14, wherein the first power supply output comprises an output of a block head switch (BHS).

16. The apparatus of claim 14, wherein the second power supply output comprises an output of a low droop oscillator (LDO).

17. The apparatus of claim 14, further comprising means for switching the CPU from the second power supply output back to the first power supply output upon the clock enable signal being asserted.

* * * * *